(No Model.)
H. M. MEETZE.
COTTON OR HAY PRESS.
No. 368,225. Patented Aug. 16, 1887.
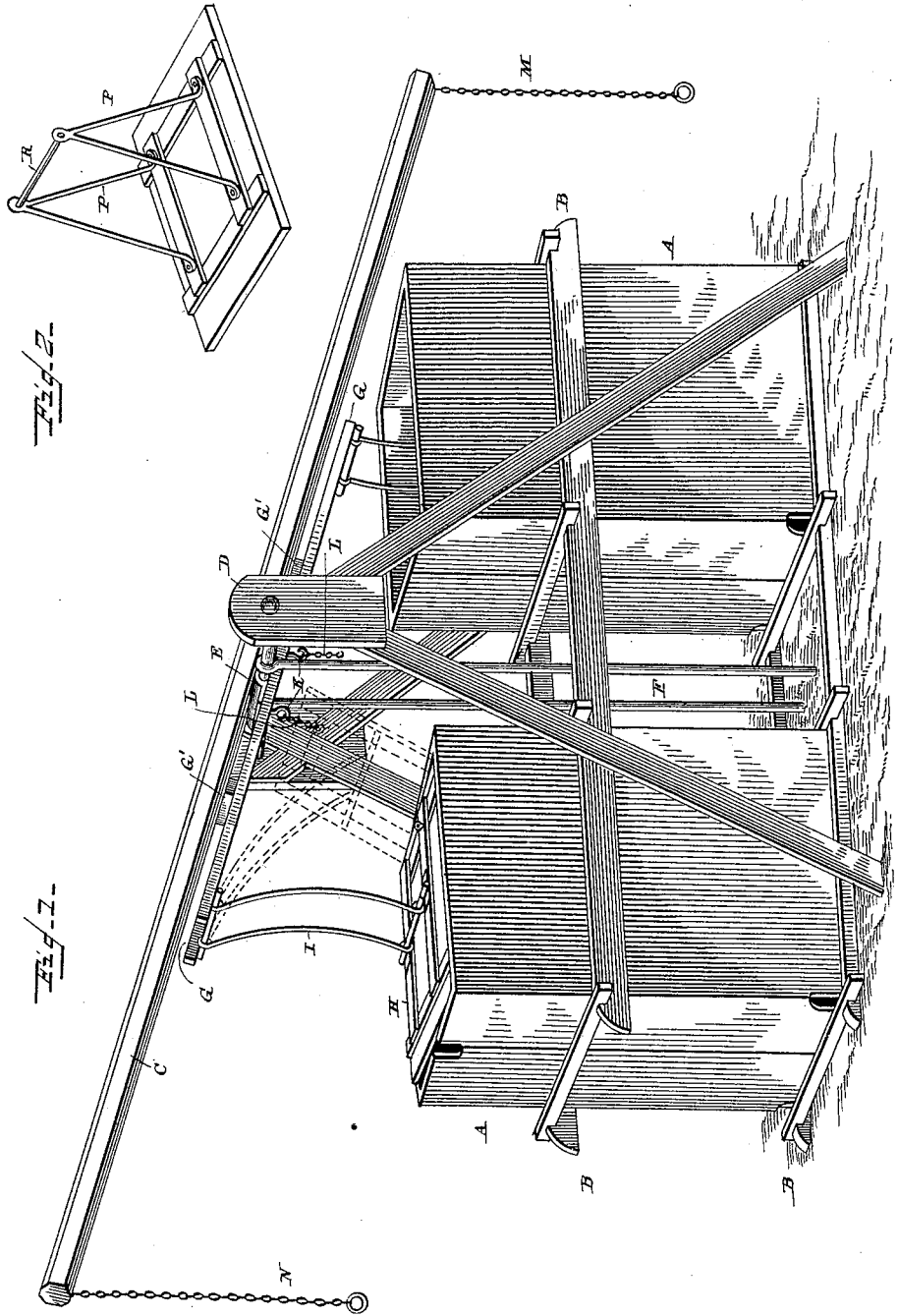
WITNESSES
Edwin L. Yewell
Alex Mahon
INVENTOR
H. M. Meetze
By
Ginsabaugh
Attorney

United States Patent Office.

HENRY M. MEETZE, OF CHARLESTON, SOUTH CAROLINA.

COTTON OR HAY PRESS.

SPECIFICATION forming part of Letters Patent No. 368,225, dated August 16, 1887.

Application filed September 7, 1886. Serial No. 212,962. (No model.)

*To all whom it may concern:*

Be it known that I, HENRY M. MEETZE, a citizen of the United States, residing at Charleston, in the county of Charleston, State of South Carolina, have invented certain new and useful Improvements in Cotton or Hay Presses, of which the following is a specification, reference being had therein to the accompanying drawings.

My invention relates to improvements in presses for baling cotton, hay, straw, and other material, of which the following is a full, clear, and exact description.

Figure 1 is a view in perspective of a double press. Fig. 2 is a view in perspective of the follower used in my single press or in the double press.

A indicates the press-boxes, the sides of which are held together by the frame-work B in such a manner as to be readily taken down, in order that the newly-formed bale may be removed therefrom, and easily put in position again to receive the material for forming new bales.

C is the lever by which pressure is applied to the material in the press-boxes, said lever being pivoted at its center to a cross-bar, E, secured in the supports or frame-work D, said frame-work being suitably anchored in the ground by rods F, or secured to a suitable base, so as to form a rigid and unyielding support for the operating-lever.

G is a supplemental lever or frame-work secured to the under side of the main lever by the cross-pieces G', and rocks with said main lever, and to the outer ends of which the followers or pressing-plates H are secured. The followers are secured to the lever or frame G, by means of the rods I, in such a manner that they can be swung back and secured to the hooks K by a chain, L, so that they will be held to one side of the press-boxes, as shown in dotted lines in Fig. 1, so that a fresh supply of the material to be pressed can be placed therein.

In operation one end of the lever C is pulled down by the chain M, thus letting one of the follower-blocks H descend into the press-box, while the other follower is raised sufficiently high to clear the top of the other press-box, when it is pushed over toward the center of the press and engaged with the hook K. By hanging the follower-block on the hook the lever will be overbalanced on this side and remain stationary until the follower-block is unhooked and brought back into the press-box. The uncovered press-box is filled with the material to be pressed, and the follower brought over and the end of the lever depressed by pulling down on the chain N. This raises the follower on the other side and enables the operator to fasten the follower on the hook and fill the press-box with fresh material. This process is repeated until two bales of the proper size and weight have been formed, the bale being held in position until the sides of the press-box have been removed and the wire or bands passed around the bale and secured, when the bale is removed and the press-box again placed in position to be refilled.

Where very heavy pressure is required, power may be applied to the lever by means of a windlass or other suitable device.

It is evident that as the operating-lever is constructed with a supplementary lever, G, and secured to the operating-lever by the cross-pieces G', said cross-pieces being secured some distance back from the ends of the supplementary lever, tends to give the levers working in unison an easy motion in operating, and it is also evident that either of the press-boxes can be removed with their follower-blocks, and the remaining one can be operated singly, as the operating-levers are pivoted to a frame anchored independently of the press-boxes.

What I claim, and desire to secure by Letters Patent, is—

The combination, with the press-boxes A, of the lever C, having supplemental levers G, the rods I, pivoted to said levers, the followers H, pivoted to the rods, and the hooks K, secured to the supplemental levers, the followers being adapted to work in the press-boxes and to swing clear of the same, so as to be held out of the way by means of the hooks when filling the press-boxes, substantially as specified.

In testimony whereof I affix my signature in presence of two witnesses.

HENRY M. MEETZE.

Witnesses:
T. H. SIRES,
A. F. LE BUFFE.